Aug. 20, 1929.                L. C. STRUENSEE                1,725,380
                              HAY DISTRIBUTOR
                       Filed April 30, 1928        2 Sheets-Sheet 1

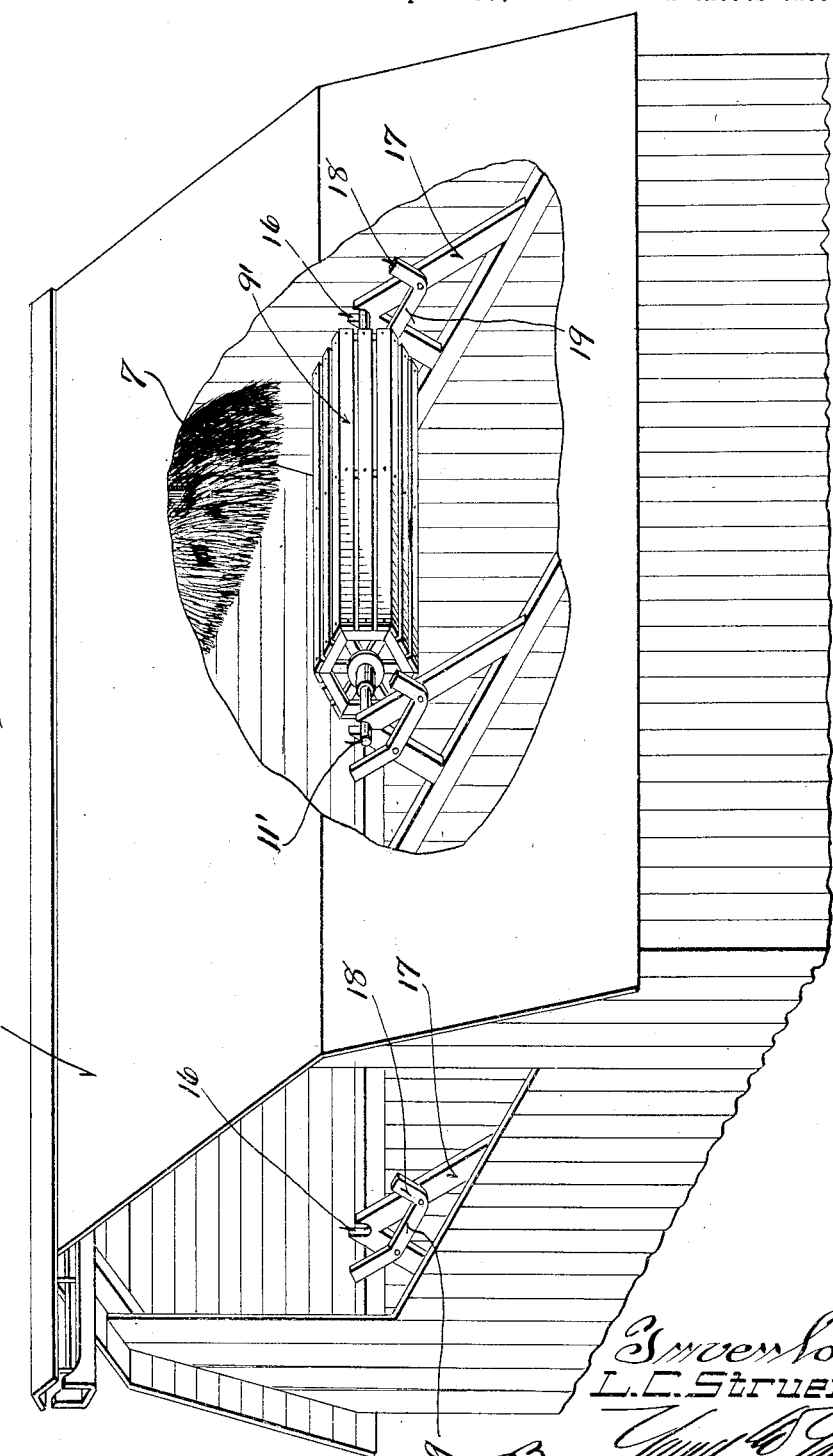

Patented Aug. 20, 1929.

1,725,380

UNITED STATES PATENT OFFICE.

LOUIS C. STRUENSEE, OF OSHKOSH, WISCONSIN.

HAY DISTRIBUTOR.

Application filed April 30, 1928. Serial No. 273,961.

This invention relates to a hay distributor.

Objects of this invention are to provide a novel form of hay distributor which is so constructed that it will automatically distribute hay to one or the other sides of a barn depending upon the manipulation of the operator, and which is also so made that it will provide a rotary discharging or guiding surface against which the falling hay may contact, so that no effort is required whatsoever on the part of the operator to secure this distribution of the hay, but the hay itself, due to its descending motion, will operate the distributor.

Further objects are to provide a novel form of hay distributor which may be positioned within a barn with the utmost facility, which will not obstruct the free and customary use of the barn, and which is of extremely simple construction.

Embodiments of the invention are shown in the accompanying drawings in which:

Figure 3 is a perspective view of a portion of a barn showing a further form of the invention.

Figure 1:
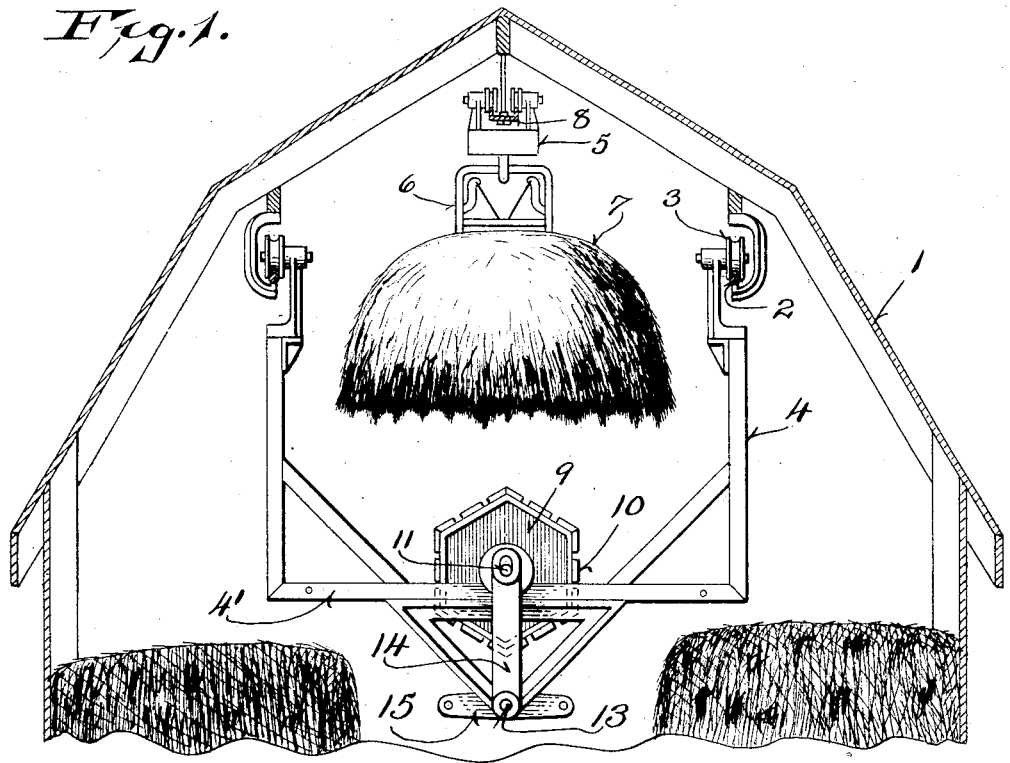
Figure 1 is a transverse sectional view through a barn showing the device in place and showing a load of hay about to be dropped thereon.
Figure 2:
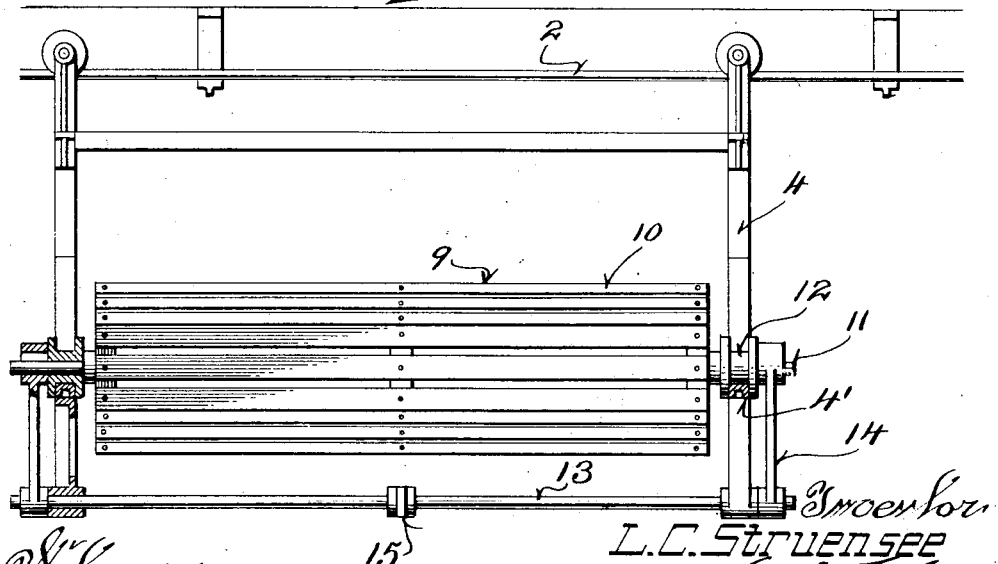
Figure 2 is a side elevation partly in section of the hay distributor.

Referring to Figure 1, it will be seen that a barn 1 has been illustrated as provided with a pair of tracks 2 upon which the rollers 3 of a travelling frame 4 are adapted to operate.

Further, the barn is provided with an upper track 8 centrally arranged and carrying a truck 5 from which the hay fork or grapple 6 is suspended, thus conveying the charge or load of hay 7 along the track and into the barn.

The frame 4 carries a revolubly mounted member 9 which is of polygonal shape and provided with a plurality of heads connected by means of spaced slats 10. The heads are carried by a shaft 11 extending through the device and carried within any suitable bearings 12. In the form shown, the bearings 12 are in the form of rollers and the lower portion 4' of the frame 4 is in the nature of a track upon which the rollers 12, or bearings, are adapted to travel.

The means for causing shifting of the bearings and consequently of the hay distributor 9 consists of a rock shaft 13 provided with slotted links 14 at opposite ends, adapted to engage the projecting shaft or trunnions 11 of the hay distributor. The rock shaft 13 also carries a pair of outwardly projecting arms 15 by means of which the shaft is rocked and consequently by means of which the position of the hay distributor is controlled. If desired, these arms or levers 15 may be provided with apertures for the reception of ropes, not shown.

In operation, the movable frame 4 is slid along its track to the desired position and the hay brought in and a load dumped upon the distributor. It is obvious that if the distributor is located slightly to the left of the center line of the load of hay, that the hay will be thrown to the right due to the free rotary motion of the distributor and thus the hay may be piled first on one side and thereafter on the other side of the barn with the utmost facility.

Further, in the event that it is not desired to shift the hay distributor, the operator may manually shift the load of hay slightly to cause it to fall on one or the other sides of the hay distributor, although the first mode of operating the apparatus is preferred.

After the hay has been stored on opposite sides of the barn, it is apparent that the movable frame 4 may be pushed out of the way and the hay may be dispensed centrally of the barn.

In the form shown in Figure 3, substantially the same ideas are employed except the hay distributor 9' is not carried by a movable frame, but has its trunnions or projecting shaft 11' carried either in the central notch 16 of stationary frames 17, or else carried adjacent either of the projecting arms 18 of a transverse member 19. The transverse member is rigidly secured to the triangular frames 17 and consequently the arms 18 form with such frames, notches on opposite sides of the center, which are adapted to receive the trunnions or shaft 11 of the hay distributor.

It is obvious, therefore, that the hay distributor may be located on either side of the center line of the barn, as required, and the load of hay indicated by the reference character 7 may be dumped on either side of the barn, as desired.

Further, it is to be noted that the hay distributor may be positioned at any one of several points, preferably a sufficient number being provided so that the entire barn may be readily filled.

It is apparent that this hay distributor avoids the necessity of keeping a man within the barn to distribute the hay as it is delivered to him. Instead, the hay is automatically distributed in a very effective manner.

Further, it is to be noted that by dumping the hay continuously first on one side of the barn until that is filled, and thereafter on the other side of the barn and subsequently in the middle of the barn, provides three piles of hay, each one distinct from the others and thus facilitates the removal of the hay with a minimum of effort on the part of the operator.

It is to be distinctly understood that numerous changes may be made within the scope of this invention to meet particular demands. For instance, the hay distributor could be made round, as required, although a polygonal shape is preferred.

Further, it is to be noted that other types of holders for the hay distributor could be used or other positions or locations therefor, although it is preferable to use it as illustrated in the drawings.

Therefore, although the invention has been described in considerable detail, such description is intended as illustrative rather than limiting as the invention may be variously embodied and as the scope of such invention is to be determined as claimed.

I claim:

In a hay distributing device, a movable frame having spaced trackways, a rotatable shaft, bearing rollers on the shaft and movable on the trackways, a revoluble member fixed on the shaft between the trackways, a rock shaft supported by the frame beneath and parallel with the first shaft, link members having one end fixed on the rock shaft and having their other ends slotted to receive the trunnions of the first shaft, and laterally projecting arms on the rock shaft having rope receiving apertures in their outer ends.

In testimony that I claim the foregoing I have hereunto set my hand at Oshkosh, in the county of Winnebago and State of Wisconsin.

LOUIS C. STRUENSEE.